United States Patent Office 3,119,111
Patented Jan. 21, 1964

3,119,111
OXIDATIVE DEHYDROGENATION OF ALKANES
Willard R. McDonald, Manhattan Beach, and Alan D. McIntyre, Torrance, Calif., assignors to Shell Oil Company, New York, N.Y., a corporation of Delaware
No Drawing. Filed Feb. 13, 1961, Ser. No. 88,655
9 Claims. (Cl. 260—680)

This invention relates to a new catalytic dehydrogenation process particularly useful in the manufacture of a lower diolefin from corresponding saturate and olefinic hydrocarbons. More particularly, the invention is concerned with a 1-step process for the oxidative dehydrogenation of more saturated $C_4$ hydrocarbons to corresponding diolefins, principally 1,3-butadiene.

The production of desirable diolefinic materials such as 1,3-butadiene from corresponding alkanes has in the past required a 2-stage dehydrogenation process for satisfactory yields. The first stage involves conversion of alkane to its corresponding olefin. This may be accomplished by use of various relatively active catalytic materials such as, for example, chrome-alumina or the like, whereby primarily olefins are formed from the alkane. In the second stage of the conventional reaction the olefins are then further dehydrogenated to form the diolefin. Various catalysts and systems involving their use have been devised for the second stage and such materials as, for example, iron oxide promoted with sizeable amounts of potassium carbonate and a small amount of chromium oxide are suggested. In addition to the disadvantages inherent in a 2-step process for manufacturing diolefins from alkanes, the particular catalytic materials in each of the two stages require specialized conditions of operation such as, for example, large excesses of steam and the like, as well as means for providing the heat requirements of each stage.

While in the aforementioned conventional first-stage process, the alkane is converted chiefly to its corresponding olefin, there will also be found generally relatively small amounts of dienes. The separation of the dienes, the monoolefins and the unconverted alkanes from the reaction product, with recycle of separated alkanes and subsequent dehydrogenation of the olefins to produce more dienes is economically disadvantageous.

It is therefore a principal object of the present invention to provide an improved process for the single-stage manufacture of a diolefin in substantial amounts from its corresponding alkane. Moreover, a further objective of the invention is to provide a novel means for dehydrogenating alkanes in the presence of free oxygen-containing gas in conjunction with a catalytic contact mass. A further object is to provide means whereby alkanes may be directly dehydrogenated to corresponding diolefins by contacting the feed containing alkanes with a fluidized mass of such contact mass, preferably in a riser-type reactor. A still further object of the invention is to provide means for the production of reasonable yields of 1,3-butadiene directly from n-butane at a relatively high rate of conversion and selectively.

It will be appreciated that in any catalytic process two factors are of great importance, to wit, conversion and selectivity. This latter is defined in terms of percentage as 100 times the moles of desired product produced divided by the moles of feed stock destroyed or otherwise converted. In dehydrogenation processes the hydrogen formed tends to reduce conversion. On the other hand, in some instances the presence of hydrogen is necessary to minimize undesirable reactions, including catalyst deactivation.

In accordance with the invention feed stocks containing essentially $C_4$ to $C_6$ hydrocarbons having a $C_4$ carbon chain and being more saturated than the diolefinic product sought are contacted with a catalytic mass comprising an alkali metal molybdate and an oxygen-containing gas under conditions sufficient to convert said feed stocks to more unsaturated products, particularly diolefins and principally a 1,3-butadiene hydrocarbon.

The process of the present invention is principally of value at present for the dehydrogenation of $C_4$ hydrocarbon streams containing n-butane and also possible quantities of $C_4$ olefins, such as n-butylene. While the alkane in the feed stock should be principally n-butane in preference to its isomer, the $C_4$ olefin may be butene-1 or butene-2, either cis or trans, or a mixture of n-butylenes. While feed stocks chiefly comprising n-butane may be derived from straight-run fractions, streams containing olefins may be provided from catalytic or thermal dehydrogenation and/or cracking of $C_4$ and higher hydrocarbons. The invention particularly contemplates the use of feed stocks rich in $C_4$ alkanes, principally n-butane, and it is to the single-stage dehydrogenation of such n-butane which the present invention is principally directed. On the other hand, the feed stock need not be limited to n-butane, per se, but may also include other materials which may or may not act as inert diluents provided that such materials do not seriously interfere with the oxidative dehydrogenation process. With regard to the $C_4$ olefins which may be present, it is preferred that they be normal butylenes; isobutylene is preferably removed.

STEAM

The feed stock may be catalytically oxidatively dehydrogenated in the presence of added steam. But it is to be emphasized that the presence of added steam is not essential to the process and is to be employed as operating conditions indicate. Recommended proportions of steam to reactant may be as much as 4 to 1, but, as indicated, larger amounts can be used if desired and, on the other hand, added steam can be omitted altogether.

OXYGEN

One of the essential requirements of the present invention is the presence of oxygen in the reaction zone. Although the exact mechanism of its action is not known, it has been found to be effective in the presence of alkali metal molybdate for the more efficient conversion of alkanes and alkenes to corresponding conjugated diolefins. According to the invention, a certain amount of oxygen is present in the reaction zone and may be passed along with the feed stock thereto. Recommended amounts are between about 0.5 and 1 mole per mole of alkane and olefin reactant, depending, of course, on the proportion of constituents in the feed stock. In the event that pure n-butane is fed into the reaction zone, the stoichiometric quantity of oxygen is one mole per mole of butane. On the other hand, if the feed stock contains 50 mole percent n-butane, 25 mol percent butylene and the remainder inert diluent, the stoichiometric quantity would be five-eighths mole per mole of feed. It is preferred to use a stoichiometric excess, for example, even twice the stoichiometric quantity. The oxygen may be supplied as pure or substantially pure oxygen or as air or oxygen mixed with any inert gas.

It is generally preferred to maintain a concentration of oxygen in the reactant mixture entering the reactor sufficient to provide at least a stoichiometric ratio of oxygen to the material reactive therewith. A slight excess of oxygen is permissible in order to remove coke as it is formed. The lower limit with regard to the quantity of oxygen is that level sufficient to provide for the desired catalytic dehydrogenation and the explosive limits control that amount of oxygen which may be in excess considerably of the preferred stoichiometric amount.

METHOD OF CONTACT

In accordance with the invention, a preferred embodiment encompasses the use of what is commonly known as a riser-type reactor. In a process involving the use of this means for contacting the feed with catalyst in the presence of an oxygen-containing gas, the feed is vaporized and preheated to approximately the reaction temperature, e.g. 600° C. This may be accomplished by passing the feed through a suitable preheater, following which the heated material is passed to the bottom of the riser reactor. Such reactor may consist of an upright vessel of relatively low ratio of diameter to length, e.g., 0.002 to 0.2. For example, one riser reactor affording completely satisfactory results is about 25 feet long and having a diameter of approximately 8 inches. The reactor may have a bend at its upper extremity allowing direct horizontal discharge into a separator, or the discharge into the separator may be through a right-angled, short-T coupling.

The catalyst, as will be more fully described hereinafter, is charged continuously to the bottom of the riser reactor and is preferably maintained at or above the desired reaction temperature. For example, it may be advantageous to provide the catalyst at about 25° C. above the reaction temperature.

When the oxidative dehydrogenation catalyst of the present invention is used in a riser-type reactor the selection of operating conditions therein may be found to be rather critical. The residence time of the feed vapors in such reaction should be not less than about 0.5 second nor more than about 4 seconds. The preferred range is about 1.0 to 1.5 seconds. This residence time is the calculated residence time assuming the vapors and gases to obey the perfect gas laws and neglecting the change of volume due to the reaction and the volume in the reaction zone actually occupied by the minor amount of catalyst. The reactor volume is measured from the point of contact of the reactant with the catalyst to the entrance in the separator.

The residence time of the catalyst should be from about one to about two times that of the feed or from about 1 to 8 seconds. A preferred range is from about 2 to 3 seconds.

The temperature may be from about 400° C. to about 650° C. The preferred temperature range is from about 575° C. to about 625° C.

The superficial linear velocity of the vapors at the reactor inlet should be about 15 feet per second and preferably from about 10 feet per second to about 20 feet per second, possibly as high as 50 feet per second.

The pressure in the reaction zone may be any practical pressure; such range considered to be from about 0.5 to about 4 atmospheres absolute. The results, so far as the reaction is concerned, improve with decreasing pressure and for this reason pressures even somewhat under 1 atm. are preferred. However, as the cost of operation increases with decrease in pressure, a compromise should be accomplished and pressures somewhat about 1 atm. may be found most advantageous.

The optimum amount of catalyst in the reaction zone will vary considerably, depending upon the density of the particles, the proportions of reactant hydrocarbons, oxygen and inert gas, temperature and the like. A suggested ratio of catalyst to feed is about 0.02 lb. of feed per lb. of catalyst. It will be appreciated that this ratio may vary within relatively wide ranges and that the catalytic activity of the particular oxidative dehydrogenation catalyst used will dictate to one skilled in the art the optimum for the particular feed stock.

On the other hand, the contact with the feed vapors, oxygen and steam, if any, may be carried out by providing the catalyst in the form of a fixed foraminous bed of particles maintained at the reaction temperature, to wit, about 600° C., and passing the gaseous material through the bed in a continuous or substantially continuous manner. In this method of operation the partial pressure of oxygen is at a maximum at the inlet of the catalyst bed and declines toward the outlet. The concentration of product, on the other hand, is substantially zero at the inlet of the bed and the maximum at the outlet. Thus, the concentration of oxygen is highest where the concentration of the desired product is lowest; and the concentration of oxygen is lowest where the concentration of the desired product is highest. This allows very high selectivity to be achieved.

When a fixed bed of catalyst is used, the dehydrogenation becomes substantial at a minimum temperature around 400° C. The preferred temperatures are between about 575 and 625° C. Higher temperatures up to about 650° C. can be used, but only if efficient means are provided to deal with the exothermic heat of reaction. The temperatures set forth are those to be experienced near the reactor inlet. Also, when such fixed bed of catalyst is used, the temperature downstream will be several degrees higher.

The preferred pressure in such reaction system is near atmospheric, e.g., 5–75 p.s.i.a. On the other hand, higher pressures up to about 45 p.s.i.g. can be used and have the advantage of simplifying the product recovery.

In general, the process of the present invention allows a high space velocity to be used. Thus, comparatively small reactor and catalyst inventories may be employed. For example, gaseous hourly space velocities up to about 600 are contemplated while still obtaining reasonable conversion of the more saturated materials. Gaseous hourly space velocity, abbreviated GHSV, is defined as the reactant vapor calculated under standard conditions (STP) passed per hour per unit volume of the catalyst bed. A wide range of space velocities may be used. Generally, space velocities between about 120 and 350 are very satisfactory.

CATALYST

It will be apparent from the foregoing that the catalyst should be supplied in a form appropriate to the type of reaction selected. For example, powdered catalyst (e.g., passing through 100-mesh U.S. standard sieve) is desirable for use in the preferred riser-type reactor. Moreover such powdered catalyst can be used in a fluidized bed wherein the reactant vapor mixture is passed therethrough as has already been described. Under such circumstances the concentrations of the reaction product, oxygen, etc. are substantially equal throughout the catalyst zone (due to the almost perfect mixing in such systems) with a consequence, however, that the results are less favorable from a selectivity standpoint in particular. Thus the oxygen instead of reacting mainly with the hydrogen may react to a greater extend to form carbon dioxide, carbon monoxide and other oxygen-containing side reaction products.

The catalyst used in the process of the present invention may be classified generally as a molydate material combined with an alkali material, preferably certain alkali metals, to wit, sodium, lithium, or a combination thereof. Moreover, the catalyst may be viewed as a complex arrangement of molybdenum oxide with alkali metals, with or without a conjoint stable acidic oxide, such as phosphorus pentoxide, as a phosphate. While the exact chemical and physical structure of the catalytic material useful in the present process is not completely known or understood, it is believed to amount to an alkali metal molybdate or an alkali metal phosphomolybdate, and for purposes of clarity, will so be referred to herein.

The catalyst may contain supplementary elements or other oxides which do not materially affect the nature of the catalyst but may reduce its cost.

The manner whereby the catalyst functions, though not completely understood, is as an oxidative dehydrogenation catalyst. Its activity in the present process requires the presence of oxygen from a supplier such as a gas containing the same.

The catalyst may be used with or without a filler or carrier material. If a carrier is used, it is preferably one having good thermal conductivity and pores of relatively large size, such, for instance, as pellets of alundum, crushed firebrick, pumice, or the like. A filler or binding in an amount up to about 80 percent by weight of the total may be included. Suitable materials are, for example, powdered alumina, and other inert materials.

While the anionic portion of the catalytic material may comprise a molybdate or phosphomolybdate, the alkali metal may be lithium, sodium, or advantageous combinations thereof. The preferred catalytic materials are lithium molybdate on Filtrol Grade 90 alumina and sodium phosphomolybdate on similar support. These preferred catalysts may be prepared by impregnating the supporting medium with a boiling aqueous solution of the desired salt for eight hours, briefly evacuating the solution-covered support to ensure displacement of all entrained air, and thereafter evacuating to dryness at about 155° C.

With regard to the preferred limits of cation to anion ratios for lithium molybdate and sodium phosphomolybdate, it has been found that the lithium$^+$/molybdenum$^{+6}$ optimum ratio lies between about 1.87 and 2.82. The sodium$^+$/molybdenum$^{+6}$ optimum ratio lies betwen 0.58 and 1.275 when the Mo$^{+6}$ is added as $$20MoO_3 \cdot 2H_3PO_4 \cdot 48H_2O$$

DILUENT

If the feed contains a substantial amount of inert diluent it may be unnecessary or undesirable to introduce any appreciable amount of any other inert material to the reaction zone. Otherwise it may be desirable to provide such inert diluent. While additional steam may be used, its presence is not requisite and in some situations may be found to be undesirable.

The following examples are presented for purposes of illustration and set forth certain preferred embodiments of the invention. However, it is not desired to limit the scope of the invention to the exact details shown in these examples, but only in accordance with the claims appended hereto.

*Example I*

A feed containing an equimolar mixture of oxygen and n-butane was passed into a riser-type reactor wherein sodium phosphomolybdate catalyst was present. The reaction was continued intermittently for a period of about 100 minutes at 600° C. at a rate of a one-second reaction period each 20 minutes and a yield of 17.2 vol. percent butadiene and 5 vol. percent n-butene (28% conversion, 21% selectivity to butenes and 63% selectivity to butadiene) was obtained. The sodium phosphomolybdate catalyst was prepared in accordance with the procedure set forth hereinbefore.

*Example II*

Using the same conditions as set forth in Example I, the n-butene byproduct was recycled over the catalyst, whereby an increase in selectivity to butadiene from 52% to 66.5% resulted.

*Example III*

100 grams of n-butane was dehydrogenated to butadiene and n-butenes by passing n-butane fed in conjunction with a minor amount of inert non-hydrocarbon diluent, in this case, helium, over a catalyst comprising lithium molybdate of approximately 20% wt. on an alumina support in the form of a fixed bed of granules deposited in an appropriate fixed bed reactor. Air was injected into the reaction mass in an amount of about 50 mole percent and the mixture was passed through the catalyst bed at a gas hourly space velocity of about 180 with respect to the butane at substantially 2 atmospheres pressure. The reactor was maintained at an average temperature of 600° C. 42 grams of n-butane feed were converted and 17.2 grams of butadiene were recovered along with 4.8 grams of butenes.

*Example IV*

Example III was repeated, using lithium molybdate as catalyst. Similar results were obtained.

It will be apparent to those skilled in the art that various modifications of the catalytic material and the conditions under which such material is employed are to be contemplated in carrying out the process of this invention. For example, the molybdate or phosphomolybdate catalysts may be used interchangeably or in admixture not only in a riser-type reactor but in a fixed foraminous bed or in other catalytic-type reactors wherein oxygen may be readily introduced and wherein appropriate temperatures and other operating conditions may be maintained. Moreover, while certain preferred methods have been delineated with respect to catalyst preparation, it will be obvious to one skilled in this specialized art that the presence of the hereinbefore described catalytic materials in the appropriate reactions constitutes an essential part of the invention.

Furthermore, while the foregoing examples illustrating a preferred embodiment of the invention with regard to the preparation of 1,3-butadiene from n-butane, it will be appreciated that mono- and dimethyl butadiene may also be prepared from corresponding $C_5$ and $C_6$ butane hydrocarbons having four carbon atoms in a chain. For example, isoprene may be prepared from methylbutane (isopentane).

In practicing the invention, it may be found advantageous under certain circumstances, as, for example, following prolonged usage, to provide for a regeneration of the catalyst in order to restore its level of activity. Such regeneration may be accomplished through the use of an oxygen-containing gas in a zone separate from the oxidative dehydrogenation reactor and under circumstances conventional in the art of catalyst regeneration.

We claim as our invention:

1. Process for an oxidative dehydrogenation of a $C_4$ to $C_6$ alkane having a 4-carbon chain directly to a 1,3-alkadiene which comprises contacting the alkane and an oxygen-containing gas in a reaction zone at a temperature between about 400 and 650° C. and a contact time between about 0.5 and 4 seconds with an oxidative dehydrogenation catalyst comprising a molybdate of an alkali metal selected from the group consisting of lithium and sodium to oxidatively dehydrogenate the alkane to a 1,3-alkadiene and alkenes along with the formation of water as a byproduct, and separating and removing the 1,3-alkadiene and alkenes from the reaction mass.

2. Process in accordance with claim 1 wherein said alkali metal molybdate catalyst comprises an alkali metal phosphomolybdate.

3. Process in accordance with claim 1 wherein said alkali metal molybdate catalyst comprises lithium molybdate.

4. Process in accordance with claim 1 wherein said alkali metal molybdate catalyst is supported on an inert carrier.

5. Process in accordance with claim 2 wherein said alkali metal phosphomolybdate is sodium phosphomolybdate.

6. Process in accordance with claim 1 wherein said alkane is n-butane and said alkadiene is 1,3-butadiene.

7. Process in accordance with claim 1 wherein said catalyst is contacted with said alkane in the presence of oxygen in a riser-type reactor.

8. Process in accordance with claim 1 wherein said contacting between said catalyst and said alkane feed in the presence of oxygen is effected by passing said feed through a fixed foraminous bed of said catalyst.

9. Process in accordance with claim 1 wherein said alkanes after separation from the reaction mass are recycled thereto for further oxidative dehydrogenation to a 1,3-alkadiene.

References Cited in the file of this patent

UNITED STATES PATENTS

| | | |
|---|---|---|
| 2,323,861 | Zellner | July 6, 1943 |
| 2,872,472 | Fenske et al. | Feb. 3, 1959 |